United States Patent
Barbat et al.

(10) Patent No.: US 9,815,427 B2
(45) Date of Patent: Nov. 14, 2017

(54) EXTERNAL ROOF-RACK MOUNTED AIRBAG

(71) Applicant: Ford Global Technologies, LLC, Dearborn, MI (US)

(72) Inventors: Saeed David Barbat, Novi, MI (US); Mohammed Omar Faruque, Ann Arbor, MI (US); Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/918,144

(22) Filed: Oct. 20, 2015

(65) Prior Publication Data
US 2017/0106827 A1 Apr. 20, 2017

(51) Int. Cl.
*B60R 21/13* (2006.01)
*B60R 21/232* (2011.01)
*B60R 21/2338* (2011.01)
*B60R 21/231* (2011.01)
*B60R 21/00* (2006.01)

(52) U.S. Cl.
CPC ............ *B60R 21/13* (2013.01); *B60R 21/232* (2013.01); *B60R 21/23138* (2013.01); *B60R 2021/0018* (2013.01); *B60R 2021/138* (2013.01); *B60R 2021/23386* (2013.01)

(58) Field of Classification Search
CPC .... B60R 2021/138; B60R 2021/23192; B60R 2021/0018; B60R 2021/23386; B60R 21/13; B60R 21/213; B60R 21/232; B60R 21/013; B60R 21/36; B60R 21/23138; B60R 9/04; B60R 9/045; B60R 9/052; B60J 7/1256
See application file for complete search history.

(56) References Cited

U.S. PATENT DOCUMENTS

| | | | |
|---|---|---|---|
| 6,237,939 B1 | 5/2001 | Resh | |
| 6,749,220 B1* | 6/2004 | Wipasuramonton | .. B60R 21/235 280/728.1 |
| 7,174,986 B2* | 2/2007 | Takimoto | ............ B60R 21/2338 180/274 |
| 7,828,106 B1 | 11/2010 | Ratajski et al. | |

(Continued)

FOREIGN PATENT DOCUMENTS

| CN | 102019894 A | 4/2011 |
|---|---|---|
| CN | 102501820 B | 4/2013 |

(Continued)

OTHER PUBLICATIONS

Search Report dated Dec. 13, 2016 for U.K. Patent Application No. GB1617711.5.

*Primary Examiner* — Keith J Frisby
(74) *Attorney, Agent, or Firm* — James P. Muraff; Neal, Gerber & Eisenberg LLP

(57) ABSTRACT

Systems for providing for an external vehicle airbag to mitigate the negative effects of vehicle rollover are described. In an exemplary implementation, one or more airbags are disposed inside the roof rails attached to a vehicle roof. In the event of a vehicle rollover, the airbags will deploy and extend downward along the sides of the vehicle. The airbags may be held in desirable deployed position by one or more elastic tethers.

16 Claims, 5 Drawing Sheets

(56) References Cited

U.S. PATENT DOCUMENTS

| | | | |
|---|---|---|---|
| 8,408,591 B2 | 4/2013 | Walston | |
| 2005/0052004 A1* | 3/2005 | Bakhsh | B60R 21/232 |
| | | | 280/730.1 |
| 2009/0266226 A1* | 10/2009 | Beach | F41H 5/007 |
| | | | 89/36.02 |

FOREIGN PATENT DOCUMENTS

| | | |
|---|---|---|
| CN | 104691478 A | 6/2015 |
| EP | 1980449 A1 | 10/2008 |
| EP | 2108547 A1 | 10/2009 |
| EP | 2894067 A1 | 7/2015 |
| GB | 2506270 A | 3/2014 |
| KR | 20020052295 A | 7/2002 |

\* cited by examiner

EXTERNAL ROOF-RACK MOUNTED AIRBAG

TECHNICAL FIELD

The following disclosure relates to an external airbag designed to mitigate the negative impact of a vehicle rollover.

BACKGROUND OF THE INVENTION

All vehicles are susceptible to rollovers to various extents. Generally, rollover tendency increases with the height of the vehicle, width of the axle, steering sensitivity, and increased speed. Trucks, SUVs, and full size vans are more likely to roll over than passenger cars because they usually have taller bodies and higher ground clearance. Occupants of a vehicle may face danger in the event of a roll-over. The roof panel or the side roof rails of the vehicle can deform and contact an occupant. To protect occupants, rollover curtain airbags running full length of inside of a vehicle along the side rails are now standard equipment in most vehicles. Sometimes however, windows are shattered during the onset of a rollover event and the curtain bag inside does not fully cover the open window, potentially allowing external objects to enter the vehicle. These objects can be outside mirrors, objects thrown inside from a overturned trailer being towed, or outside objects thrown loose due to the accident to inside the vehicle. Accordingly, there is a need for a system to mitigate dangers in the event of a vehicle rollover.

SUMMARY OF THE INVENTION

Systems are provided for mitigating the potential negative impacts of a vehicle rollover. The systems can include external airbags disposed inside of a vehicle's roof rails. In the event of a rollover, the airbags can be inflated by one or more inflators integrated with the vehicle's electrical grid and rollover sensors. When deployed, the airbags can extend down the sides of the vehicle and may be held in place by one or more elastic tethers.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION OF EXEMPLARY EMBODIMENTS OF THE INVENTION

Figure 1:
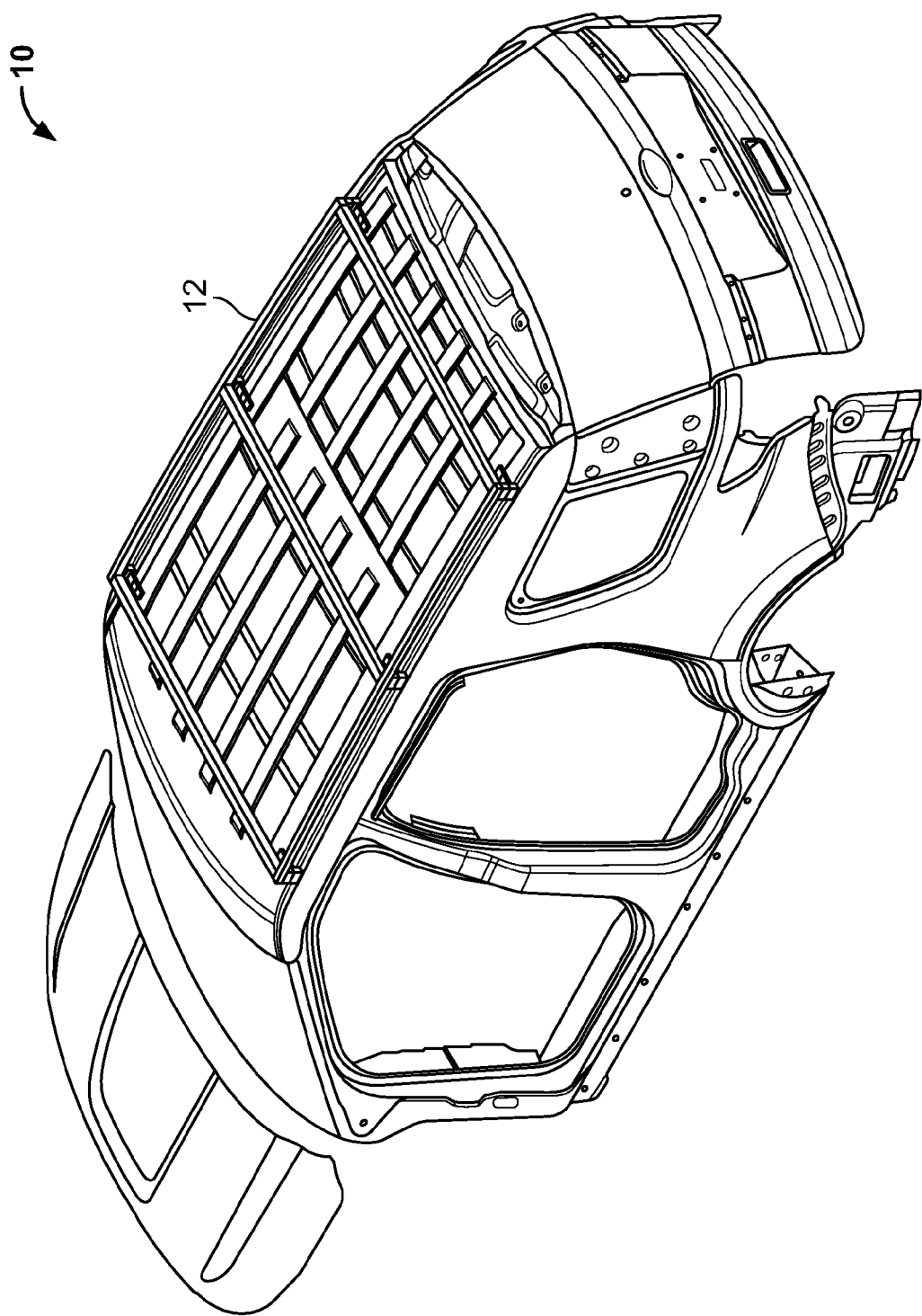
FIG. 1 is an elevated diagram illustrating an exemplary embodiment of a system in accordance with the invention.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 illustrates components of an exemplary embodiment system in accordance with the invention. One or more rails 12 can be mounted onto an exterior portion of a vehicle 10 such as the roof. One or more airbags 14 can be disposed inside each rail 10 for deployment in the event of a vehicle rollover. In the present embodiment, the airbags 14 are tubular in shape and extend for the entire length of each rail 12. However, those of skill in the art will recognize that a variety of airbag shapes and sizes could be employed without departing from the novel scope of the present invention.

Figure 2:
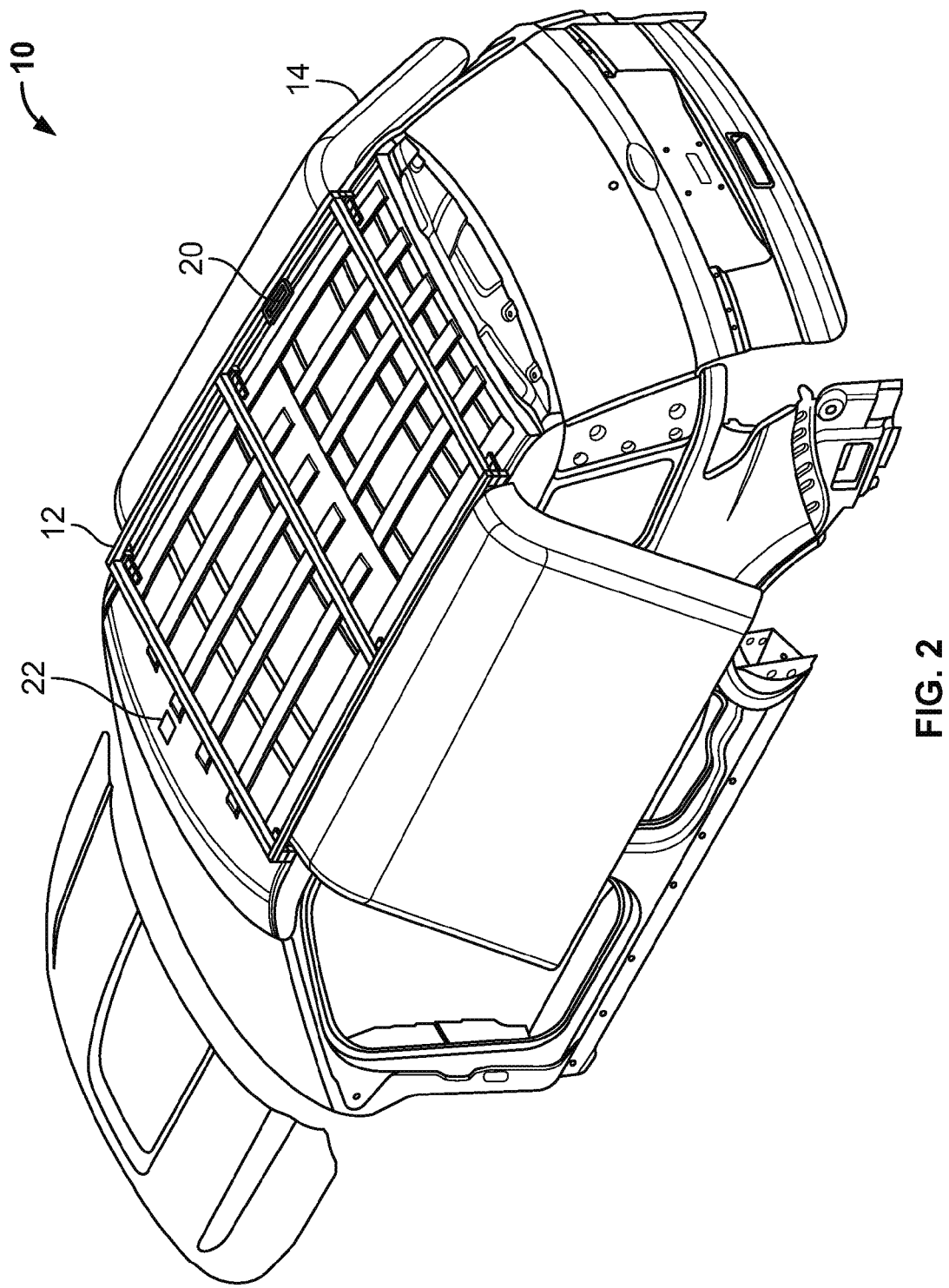
FIG. 2 is an elevated diagram that graphically depicts an embodiment of the invention showing airbags in a deployed state.
Figure 3:
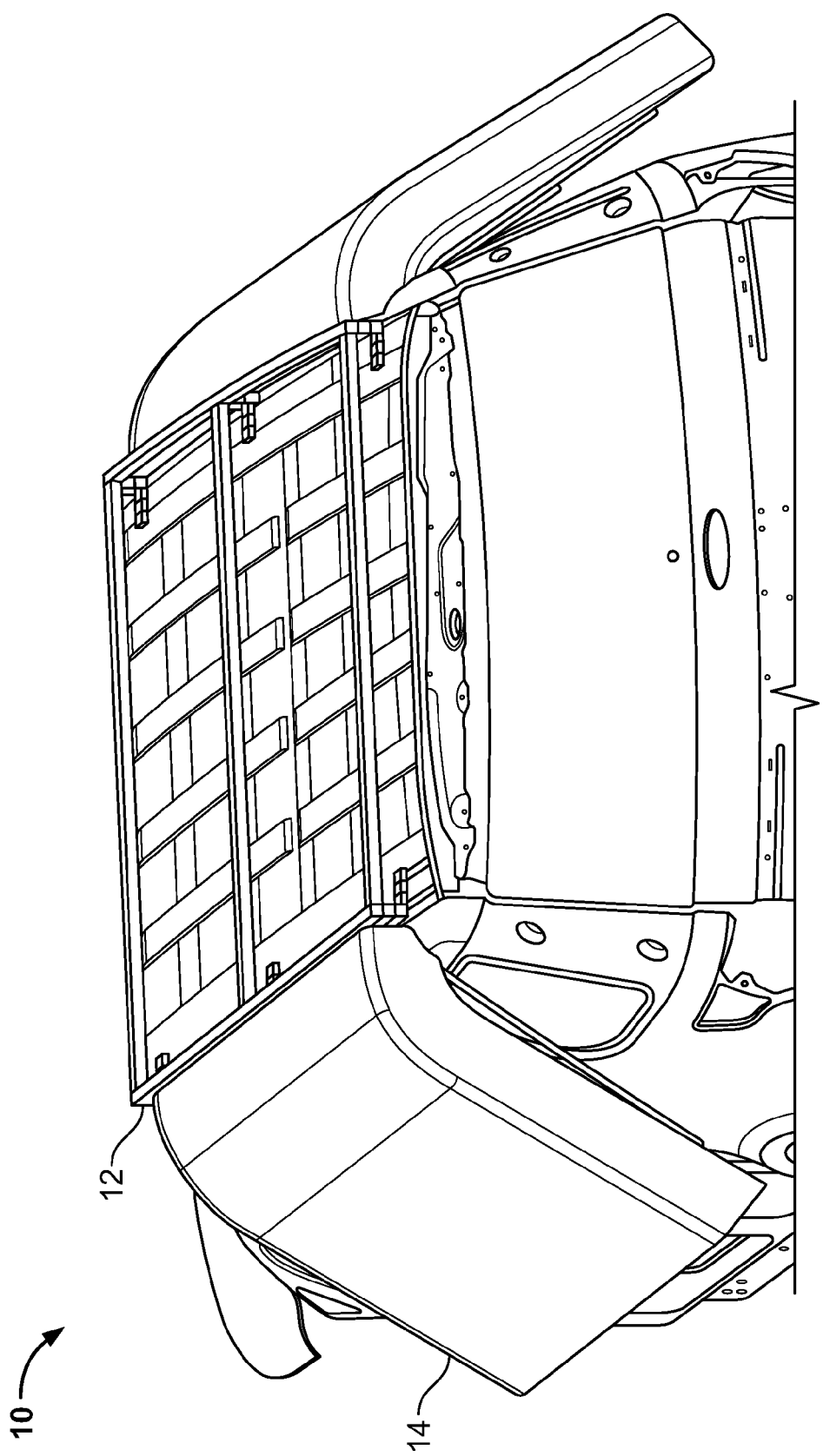
FIG. 3 is a rear view diagram that graphically depicts an embodiment of the invention showing airbags in a deployed state.

FIG. 2 and FIG. 3 show an embodiment of the present invention with the airbags 14 in a deployed state. In the event of deployment, the airbags 14 are inflated by an inflator module 20. The inflator module 20 may be housed inside one or more of the rails 12, in a separate housing mounted to the exterior of the vehicle 10, or inside one or more of the internal existing vehicle components such as the rear high stop 16 or tail lamp of the vehicle 10. The inflator module 20 can have an independent power source included or be electrically integrated into the vehicle circuitry at a convenient junction such as the rear high stop 16 or tail lamp. The inflator module 20 is also able to communicate with the vehicle's rollover sensor 22. In the event of a vehicle rollover, the rollover sensor 22 will send a signal to the inflator module 20, which will activate and cause the airbags 14 to deploy. Embodiments of the present invention also could include a plurality of inflator modules 20 depending on the particular needs and dimensions of a vehicle 10 and accompanying roof rails 12.

Figure 4:
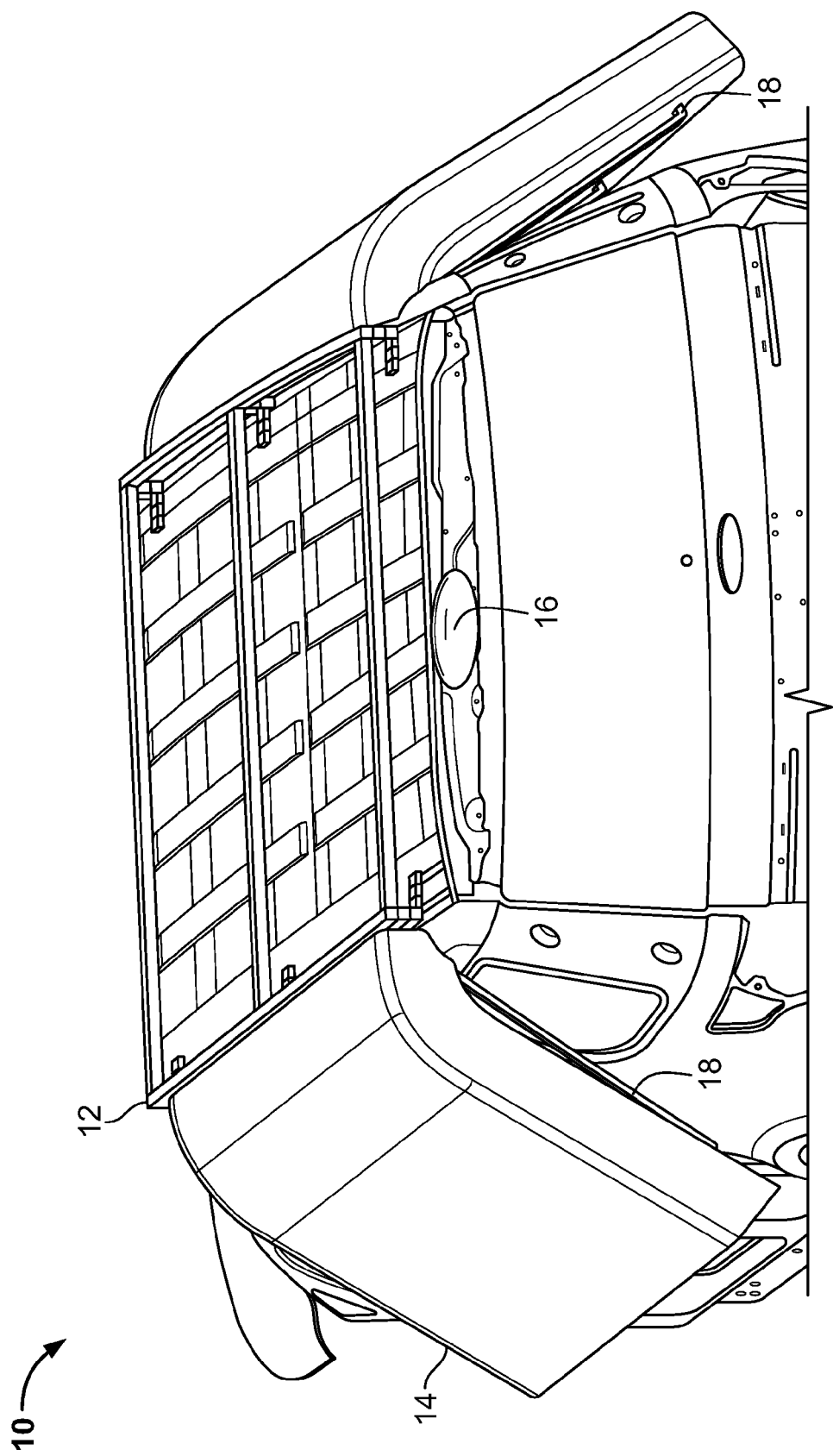
FIG. 4 is a rear view diagram that graphically depicts an embodiment of the invention showing airbags in a deployed state and further design details.
Figure 5:
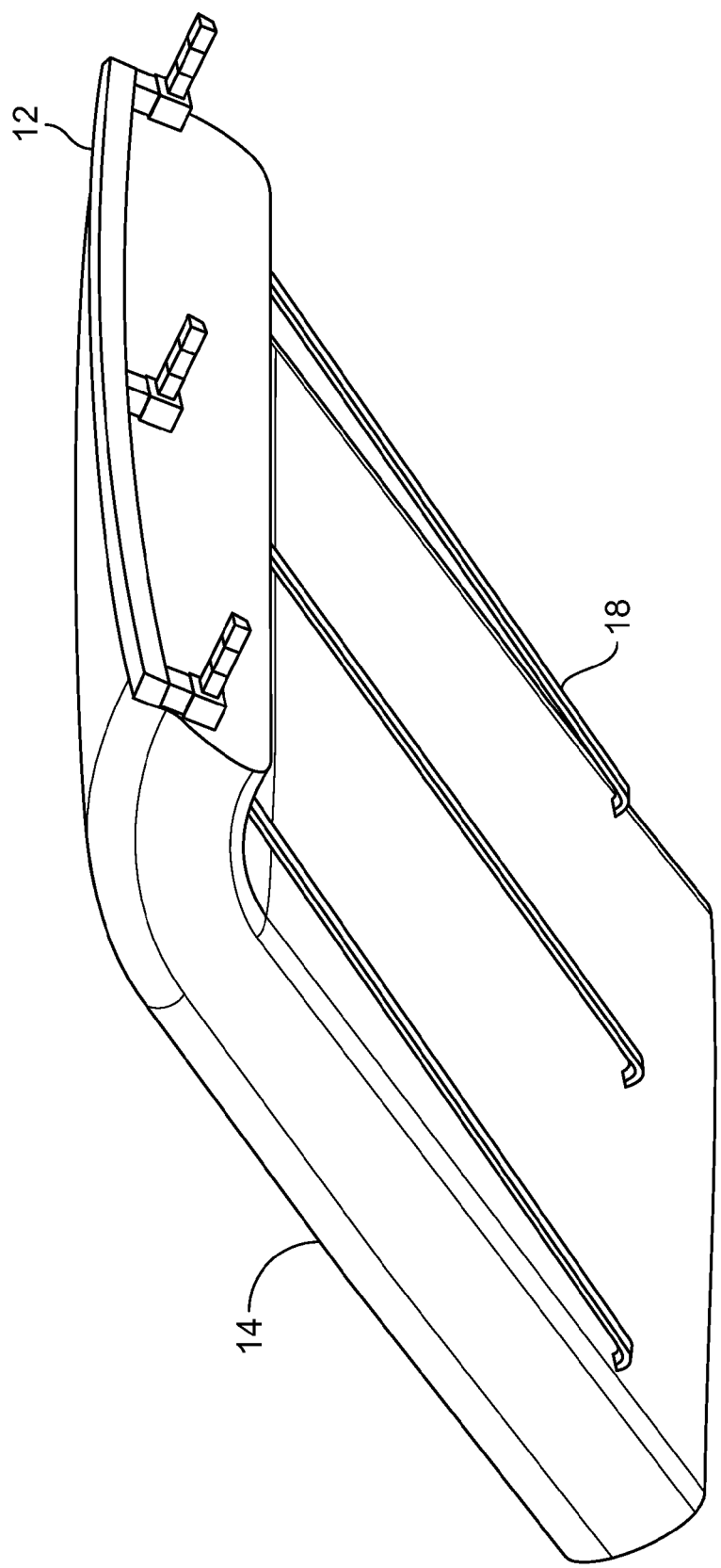
FIG. 5 is an elevated diagram of an embodiment of an airbag in accordance with the invention.

FIG. 4 and FIG. 5 show the positioning of deployed airbags 14 in an embodiment of the present invention. When deployed, the airbags 14 will extend down the sides of the vehicle 10 in order to cover at least some of the vehicle's side windows. This positioning can be achieved by the inclusion of one or more tethers 18. The tethers 18 can be made of an elastic material and are attached to the airbags 14 such that the tethers 18 hold the deployed airbags 14 down in the desired position covering the sides of the vehicle 10. The number of tethers 18 can be reduced or increased based on the size of the airbag 14. The tethers 18 may also be attached to the rails 12 to achieve a desired airbag 14 positioning during deployment. Desired airbag 14 positioning may result in mitigation of negative effects in the event of a rollover. The airbags 14 can be constructed using tear or puncture resistant lightweight, high-strength, oriented-strand fabric material to provide maximum protection. Various suitable materials that are commercially available include Dyneema by DSM and Energy Absorbing Fabric by Energetic Textile Partners, LLC.

It should be understood that the invention is not be limited to any single embodiment and should only be construed in breadth and scope in accordance with recitation of the appended claims.

We claim:

1. A vehicle external airbag system comprising:
    a rail member configured to be attached to the roof of a vehicle;
    an airbag disposed inside of the rail member; and
    an inflator configured to inflate the airbag,
    wherein the inflator is integrated into a rear high stop of the vehicle.

2. The system of claim 1 wherein the airbag is coextensive in length with the rail member.

3. The system of claim 1 further comprising a rollover sensor.

4. The system of claim 3 wherein the rollover sensor can communicate with the inflator.

5. The system of claim 1 wherein the inflator is electrically connected to the vehicle.

6. The system of claim 5 wherein the inflator is electrically connected to the vehicle at a rear tail lamp of the vehicle.

7. The system of claim 1 wherein the airbag is configured such that when deployed, the airbag covers one or more windows on a side of the vehicle.

8. The system of claim 1 further comprising a tether attached to the airbag.

9. The system of claim 8 wherein the tether is comprised of an elastic material.

10. The system of claim 8 wherein the tether is further attached to the rail member.

11. The system of claim 8 wherein the tether is attached to the airbag at two separate points.

12. The system of claim 8 wherein the tether is configured to pull one end of the airbag toward a side of the vehicle when the airbag is deployed.

13. A vehicle external airbag system comprising:
    a rail member configured to be attached to a roof of a vehicle;
    an airbag disposed inside of the rail member; and
    an inflator configured to inflate the airbag,
    wherein the inflator is integrated into a tail lamp housing of the vehicle.

14. The system of claim 13 wherein the inflator is electrically connected to the vehicle at a rear tail lamp of the vehicle.

15. The system of claim 13 further comprising a tether attached to the airbag.

16. The system of claim 15 wherein the tether is configured to pull one end of the airbag toward a side of the vehicle when the airbag is deployed.

* * * * *